Patented Aug. 31, 1937

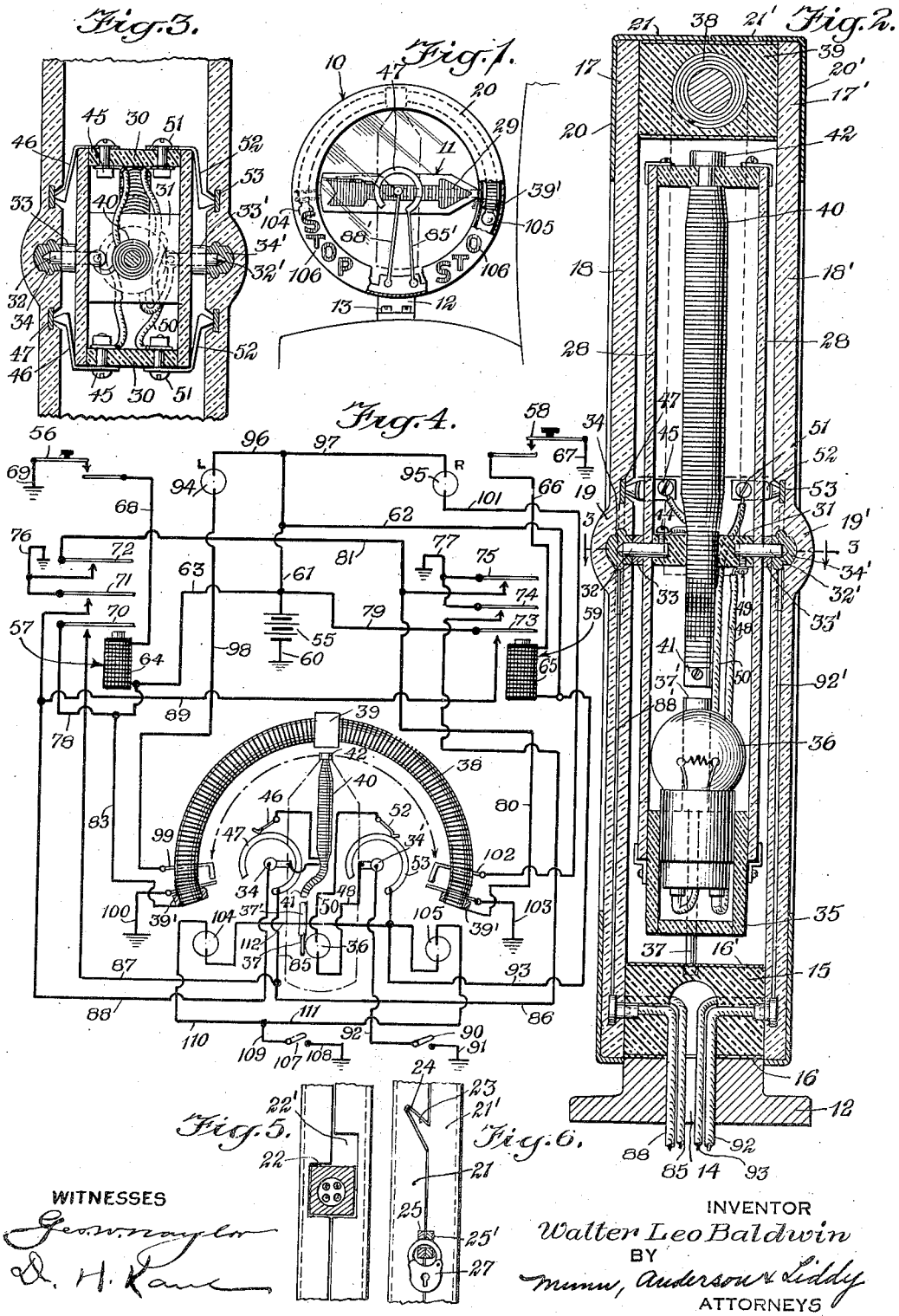

2,091,843

UNITED STATES PATENT OFFICE 2,091,843

SIGNALING APPARATUS

Walter Leo Baldwin, Jacksonville, Fla.

Application February 11, 1936, Serial No. 63,311

2 Claims. (Cl. 177—337)

This invention relates to improvements in signaling apparatus and has particular relation to signaling apparatus for indicating various operations or movements of an automobile, such as right turns, left turns, and stopping of the automobile.

It is an object of the invention to provide signaling apparatus which is an improvement upon the apparatus shown in my Patents Nos. 1,511,100 and 1,618,907 and which is of sturdy, rugged construction and will operate for long periods of time with freedom from wear and breakage.

A further object is to provide signaling apparatus having a pivotally mounted directional pointer or arrow for indicating right and left turns of the vehicle and which is supported directly by glass walls provided in the casing which encloses the pointer or arrow.

A further object is the provision in signaling apparatus of the type embodying an electromagnetically operated directional pointer of improved contact means which insure positive electrical connections and minimize the danger of grounds or short circuits.

Another object is to provide auxiliary indicating means in signaling apparatus of the above type which is caused to operate by the pivoting of the directional pointer to a pre-determined point.

For a full understanding of the invention reference should be had to the accompanying drawing in which—

Fig. 1 is a rear elevation of signaling apparatus embodying my present invention illustrated as attached to the fender of an automobile;

Fig. 2 is a sectional side elevation through the center of my signaling apparatus with the pointer disposed in upright or vertical position;

Fig. 3 is a sectional view of the central portion of my signaling apparatus in the direction of the arrows on the line 3—3 in Fig. 2;

Fig. 4 shows the arrangement of electromagnets, relay switches and lights, and also illustrates diagrammatically the electrical circuits;

Fig. 5 is a detailed view of the portions of the casing surrounding the base of the signaling apparatus;

Fig. 6 is a detailed view of the locking mechanism for holding the casing in closed position.

My improved apparatus consists of a casing indicated generally by the numeral 10 having pivotally mounted therein a directional pointer or arrow 11 for indicating changes in direction of movement of the vehicle to which the apparatus is attached.

The casing is formed of a base member 12 which is secured to a convenient portion of the automobile as by the screws 13 and has a passage 14 therethrough for the electric wires, an insulating block 15 suitably secured to the upper end of the base member 12 and having a passage therethrough communicating with the passage 14, a pair of concentric spaced rims 16 and 16', the rim 16 passing below the member 15 and the rim 16' passing above it, and a pair of complementary circular shells 17 and 17' which form an enclosure within which the directional arrow 11 is pivotally mounted. The shells 17 and 17' are formed of disks 18 and 18' made of electrically non-conducting transparent glass having thickened central portions as at 19 and 19' made by providing convex projections integral with the outer surface of the glass and having metal frames formed around the edge of the glass disks and provided with vertical portions 20 and 20' and inwardly projecting peripheral flanges 21 and 21' which pass over and engage the rim 16. The metal frame may be secured to the glass as by a suitable adhesive if desired.

Adjacent the lower portion of the shells the flanges 21 and 21' are formed with cutout portions 22 and 22' for receiving the base member, and one of the cutout portions such as 22' is of sufficient size so as to permit relative circumferential shifting of the shell 17' with respect to the shell 17 and the base 12. The purpose of providing for the limited circumferential shifting is to permit of closing and opening the latch mechanism which I provide for retaining the casing in closed position. This mechanism includes a plurality of angularly disposed laterally projecting tapering members 23 formed on the inner edge of flange 21' at spaced intervals and which are adapted to project into complementary angularly disposed tapering notches 24 formed in the edge of flange 21 at similar spaced intervals as shown in Fig. 6. By rotating the shells 17' in counterclockwise direction the members 23 will be released from the notches 24 while rotation of the shell 17' in a clockwise direction will cause the members 23 to project into the notch 24 so as to retain the shells in closed position. To prevent accidental relative shifting between the two shell members while in closed position I provide suitable locking mechanism such as U-shaped eyepieces 25 and 25' on each of the flanges 21 and 21' through which a lock 27 may be secured.

The directional pointer 11 pivotally mounted inside of the casing is formed of transparent front and rear members 28 which may have an arrow outlined thereon in red as shown at 29, and lateral ends 30 formed of a non-transparent material and suitably secured to the side members 28. Suitably secured across the central portion of the inside of the arrow is a supporting platform 31 formed of insulating material in which are embedded a pair of pivots 32 and 32' formed of good conducting material and which extend outwardly through the sides 28 of the arrow through spacers 33 and 33' into bearings 34 and 34' likewise formed of a conducting material and which are embedded in the thickened portions 19 and 19' of the glass sides. The lower end of the arrow is provided with a counterweight as at 35 so as to aid in returning the arrow to its vertical position after operation has been completed as shown in Fig. 2, and above the counter-weight the arrow is preferably provided with a light 36 to illuminate the arrow and make it more visible.

The arrow is normally held in vertical position as shown in the dotted line in Fig. 1, by means of slidable pin or latch 37 engageable in a keeper formed in member 15 and passing through an opening in counterweight 35 to the inside of the arrow where it is connected to armature 37' which is controlled by the pole 41 of electromagnet 40 disposed inside the arrow. When the arrow points to the right as shown in full lines in Fig. 1, it indicates a right turn of the vehicle; while when it points to the left it indicates a left turn.

To control the pivotal movement of the arrow so as to cause it to point right or left as desired, I provide an arcuate electromagnet indicated at 38 having a uni-directional circuit which is mounted inside the casing 10 and extends around the periphery thereof from a point slightly below the center of one side, as shown in dotted lines in Fig. 2, to a point slightly below the center at the opposite side, and another electromagnet 40 disposed inside the arrow and having a circuit whose direction of current flow may be varied so as to cause it to pivot towards the opposite ends of the arcuate electromagnet 38 depending upon its polarity as determined by the direction of the current flow. The arcuate electromagnet is held in position in the casing by means of the insulator block 39 at the center thereof and insulating blocks 39' at the ends thereof surrounding the magnet and secured between the rims 16 and 16', while the magnet 40 disposed within the arrow is supported by having its lower end embedded in the supporting sheet 31 with pole 41 projecting therethrough, while its upper end projects outwardly through the top of the arrow and is provided with an enlarged head portion 42. The pole 41 of magnet 40 controls the operation of armature 37' and accordingly of latch 37.

One end of the winding of the magnet 40 is connected to a terminal 44 which is embedded in the sheet 31 and contacts the pivot 32 which in turn contacts the bearing 34, while the other end of the winding is connected to the terminals 45 which are secured to a pair of resilient metal contact arms 46 extending outwardly at an angle from one face of the arrow and positioned so as to engage an arcuate metal contact strip 47 embedded in the glass side or wall 18 around the sides and top of thickened portion 19 and having its surface on the inside of the casing exposed so as to make electrical contact with the arms 46. The electric light 36 is connected by means of a wire 48 to the other pivot 32' and bearing 34' through terminal 49 embedded in the supporting sheet 31 and by means of wire 50 to a pair of terminals 51 secured to spring metal contact arms 52 which are similar to arms 46 and which engage arcuate contact strip 53 similar to the strip 47 and embedded in the glass 18' so as to have an exposed surface inside the casing making contact with the arms 52. The contact arms 46 and the contact strips 47 and 53 are so arranged that the arms engage their respective strips throughout the pivotal movement of the arrow or directional pointer.

To actuate the magnets and to vary the direction of current flow in the electromagnet 40, I provide a suitable source of current supply such as the battery 55, a pair of control switches 56 and 58 conveniently located on the steering post, steering wheel rim or dash board of the car, and a pair of relays 57 and 59 which are operated by the switches 56 and 58 respectively as shown in Fig. 4. One side of the battery is connected to a ground by the wire 60, and the other side is connected by wires 61 and 62 and wires 61 and 63 to one end of each of the coils of the electromagnets 64 and 65 of the relays 57 and 59. The other end of the coil of the electromagnet 65 is connected by wire 66 to one terminal of the switch 58, the other terminals of the switch being grounded by wire 67, while the other end of the coil of the magnet 64 is connected by wire 68 to one terminal of the switch 56 which is grounded by wire 69. Each of the relays 57 and 59 controls three circuit breakers, those of relay 57 being indicated by the numerals 70, 71, and 72, and those of relay 59 being indicated by the numerals 73, 74, and 75. The switches are normally in open position but it will be seen that closing of the switch 58 will result in actuation of the electromagnet 65 with the result that circuit breakers 73, 74, and 75 will be closed, while closing of the switch 56 will result in the actuation of the electromagnet 64 with a corresponding closing of the circuit breakers 70, 71, and 72. One terminal of each of the switches 71 and 72 is connected by wire 76 to a ground and one terminal of each of the switches 74 and 75 is likewise connected by means of wire 77 to a ground, the remaining switches 70 and 73 being connected by means of wires 78 and 63 and wire 79, respectively, to the ungrounded terminal of the battery.

As previously stated, the current flow of the arcuate electromagnet 38 is always uni-directional and accordingly the one end of the wiring of the magnet is connected by wire 80 to the switch 75 and by the wires 80 and 81 to the switch 72, while the other end of the wiring is connected by wires 83, 78 and 63 to the ungrounded terminal of the battery 55. Accordingly the operation of either of the switches 56 or 58 will result through the closing of switches 72 or 75 in current flowing through the arcuate magnet 38 in the same direction, i. e., from the battery through wires 63 and 83 to the one end of the winding of magnet 38 and thence through wire 80, switch 75 to the ground or through wires 80 and 81, switch 72 to the ground.

The direction of the current flow through the magnet 40 varies in accordance with which switch is actuated. To accomplish this the contact strip 47 is connected by means of leads 85 and 86 to the switch 74 of relay 59 and by leads 85 and 87 to switch 70 of relay 57, and bearing 34 is connected by wire 88 to switch 71 and by wires 88 and 89 to switch 73.

It will be seen that actuation of switch 58 results in completing the circuit of magnet 65 causing the switches 73, 74, and 75 to close. Current will then flow from the battery through wires 63 and 83, through the arcuate magnet 38, wire 80, switch 75, wire 77, to the ground. Current will likewise flow from the battery through wire 79, switch 73, wires 89 and 88, bearing 34, pivot 32, terminal 44, through the coil of the magnet 40, thence through terminals 45, contact arms 46, contact strip 47, wires 85 and 86, and through switch 74 to the ground. This will result in the releasing of latch member 37 and the pivoting of arrow 11 to the right to indicate a right turn as shown in full lines in Fig. 1.

Actuation of the switch 56 will result through the closing of switch 72 in a current flow through arcuate magnet 38 in the same direction. However, the closing of switches 70 and 71 will result in a flow of current through the coil of magnet 40 in a direction opposite to the flow caused by the closing of switches 73 and 74. Thus upon the closing of switches 70 and 71 the current will flow from battery 55 through wires 63 and 78, switch 70, wires 87 and 85, contact strip 47, contact arms 46, terminals 45, one end of the coil of magnet 40, and thence from the opposite end of the coil through terminal 44, pivot 32, bearing 34, wire 88, and through switch 71 to the ground. Latch 37 will accordingly be released and the arrow 11 will thereupon be caused to pivot to the left, thereby indicating a left turn.

The circuit of light 36 disposed inside the arrow is controlled by switch 90 connected at one side by wire 91 to a ground, and the other side by wire 92 to bearing 34' which in turn makes contact with pivot 32' connected by terminal 49 to wire 48 leading to the bulb 36. The other wire 50 leading from the bulb 36 is connected through terminals 51 to contact arms 52 which engage contact strip 53 which in turn is connected by wires 93, 62, and 61 to the ungrounded side of the battery 55. The closing of the switch 90 which is placed in convenient location inside the car, such as on the steering post or dash board, results in lighting of the light 36.

If desired, auxiliary signaling means, such as a pair of electric lights 94 and 95, may be provided. These are preferably mounted on the instrument panel in front of the driver so that he will have a visual indicator showing whether the signal is operating properly. One side of light 94 is connected by wires 96 and 61 to the ungrounded side of the battery, while one side of light 95 is connected by wires 97 and 61 to the ungrounded side of the battery. The other side of light 94 is connected by wire 98 to a normally open circuit breaker or switch 99 disposed a short distance before the left end of the arcuate magnet 38 in the path of movement of the arrow 11, so that when the arrow 11 is caused to pivot to the left by the actuation of switch 56 the enlarged protruding head 42 of the core of magnet 40 will engage the switch 99 and close it. The other side of the switch 99 is connected by wire 100 to a suitable ground with the result that the closing of switch 99 by the pivoting of the arrow to the left will result in lighting of light 94, thus indicating to the driver that the signaling apparatus is operating properly. The other side of light 95 is connected by wire 101 to normally open circuit breaker or switch 102 disposed a short distance from the right end of arcuate magnet 38 in the path of movement of the arrow 11 so that the enlarged end 42 of the core of magnet 40 will engage the switch and cause it to close, thereby completing the circuit from the battery through light 95, switch 102, wire 103, to a ground. Both switches 99 and 102 are mounted inside the casing a short distance before the respective ends of arcuate magnet 38 and are preferably secured to the rim 16' of the casing.

Stop lights 104 and 105 should likewise be provided and these are preferably located inside and mounted on the casing 10 adjacent the periphery of the bottom thereof between the rims 16 and 16'. The word "Stop" may be stencilled in the frame 20 adjacent the lights as indicated at 106. The operation of the stop lights is controlled in the well-known manner by means of switch 107 controlled by the actuation of the brake lever and which is connected by wire 108 to a suitable ground. Switch 107 is connected by wires 109 and 110 to light 104 and by wires 109 and 111 to light 105. Both lights are connected by means of wires 112, 93, and 62 to the ungrounded side of the battery 55.

To further protect the electrical circuits from being short-circuited or from being accidentally broken, I embed the leads to the contact strips 47 and 53 and to the bearings 34 and 34' in the glass sides of the casing as shown at 85', 88', 92', and 93' (the latter is not shown but corresponds to 85' on the opposite face of the apparatus). This is more specifically shown in Figs. 1 and 2. In Fig. 2 it will be seen that these leads are completely surrounded by the glass sides of the casing and since the glass, as previously stated, is non-conducting, it will thoroughly insulate the leads. The lower ends of the glass embedded leads 85', 88', 92' and 93' are connected to wires 85, 88, 92, and 93.

Thus it will be seen by the herein illustrated and described mechanism that an improved signaling apparatus has been provided of rugged construction, which will operate for long periods of time with freedom from breakage and wear, and that furthermore the mechanism will operate in a positive and sure manner free from short circuits, poor connections, and the like, due to the improved electrical connections herein provided.

I claim:

1. Signaling apparatus for vehicles comprising a casing having a transparent glass plate, a pivotally mounted directional pointer in said casing for indicating changes in direction of movement of the vehicle, an electromagnet in said pointer, and means for connecting said electromagnet to a source of electric current, said means comprising a contact strip embedded in said glass plate and having an exposed surface inside said casing, and a contact member mounted on said pointer and cooperable to engage said contact strip.

2. Signaling apparatus for vehicles comprising a casing having a pair of transparent glass plates, a directional pointer pivotally mounted between the glass plates and provided with means for causing it to normally point in one direction, means including an electromagnet in the pointer for causing the pointer to pivot through an arc so as to indicate changes in the direction of movement of said vehicle, an electric bulb disposed in said pointer, and means for connecting said electromagnet and bulb to a source of electric current, said means including arcuately disposed contact strips embedded in said glass plates and having an exposed surface inside said casing and two contact members mounted on said pointer and cooperable to engage said contact strips.

WALTER LEO BALDWIN.